United States Patent [19]

Tamura

[11] 4,326,743

[45] Apr. 27, 1982

[54] WEEDING TOOL

[76] Inventor: Kazutaka Tamura, 1801 17th Ave. South, Seattle, Wash. 98144

[21] Appl. No.: 164,352

[22] Filed: Jun. 30, 1980

[51] Int. Cl.$^3$ .......................... A01B 1/16; A01D 9/02
[52] U.S. Cl. .................................... 294/55.5; 172/378
[58] Field of Search ................. 294/49, 50.6, 52, 55.5, 294/61, 122, 125, 126; 30/322, 351, 355; 56/400.21; 171/105, 107; 172/378–380; 254/131.5, 132

[56] References Cited

U.S. PATENT DOCUMENTS

| | | | |
|---|---|---|---|
| 222,695 | 12/1879 | Griffith | 294/55.5 |
| 409,619 | 8/1889 | Stebbins | 172/378 |
| 596,579 | 1/1898 | Dutton | 254/131.5 |
| 747,986 | 12/1903 | Layne | 294/55.5 |
| 1,577,927 | 3/1926 | Morse | 172/378 X |
| 1,723,616 | 8/1929 | Hawkins | 56/400.21 X |
| 2,157,915 | 5/1939 | Olson | 294/50.6 X |
| 2,635,336 | 4/1953 | Seymour | 294/50.6 X |
| 2,637,104 | 5/1953 | Samson | 30/322 |
| 3,110,349 | 11/1963 | Means | 294/50.6 X |

FOREIGN PATENT DOCUMENTS 15529 of 1909 United Kingdom .............. 294/50.6

Primary Examiner—Johnny D. Cherry
Attorney, Agent, or Firm—Christensen, O'Connor, Johnson & Kindness

[57] ABSTRACT

A weeding tool is provided in the form of a fork having a plurality of tines, each tine having teeth which project outwardly and rearwardly from lateral edges thereof. The tines are employed for breaking up and loosening soil around relatively large weed roots. The teeth along the tine edges collect and withdraw small, hair-like rootlets dispersed throughout the soil in association with the larger roots. In a preferred embodiment the rearwardly directed teeth are offset in a crosscut configuration and are staggered along edges of adjacent tines to increase their effectiveness. The removal of rootlets during the course of ordinary weeding with the tool reduces regeneration of weeds by propagation of the rootlets.

4 Claims, 4 Drawing Figures

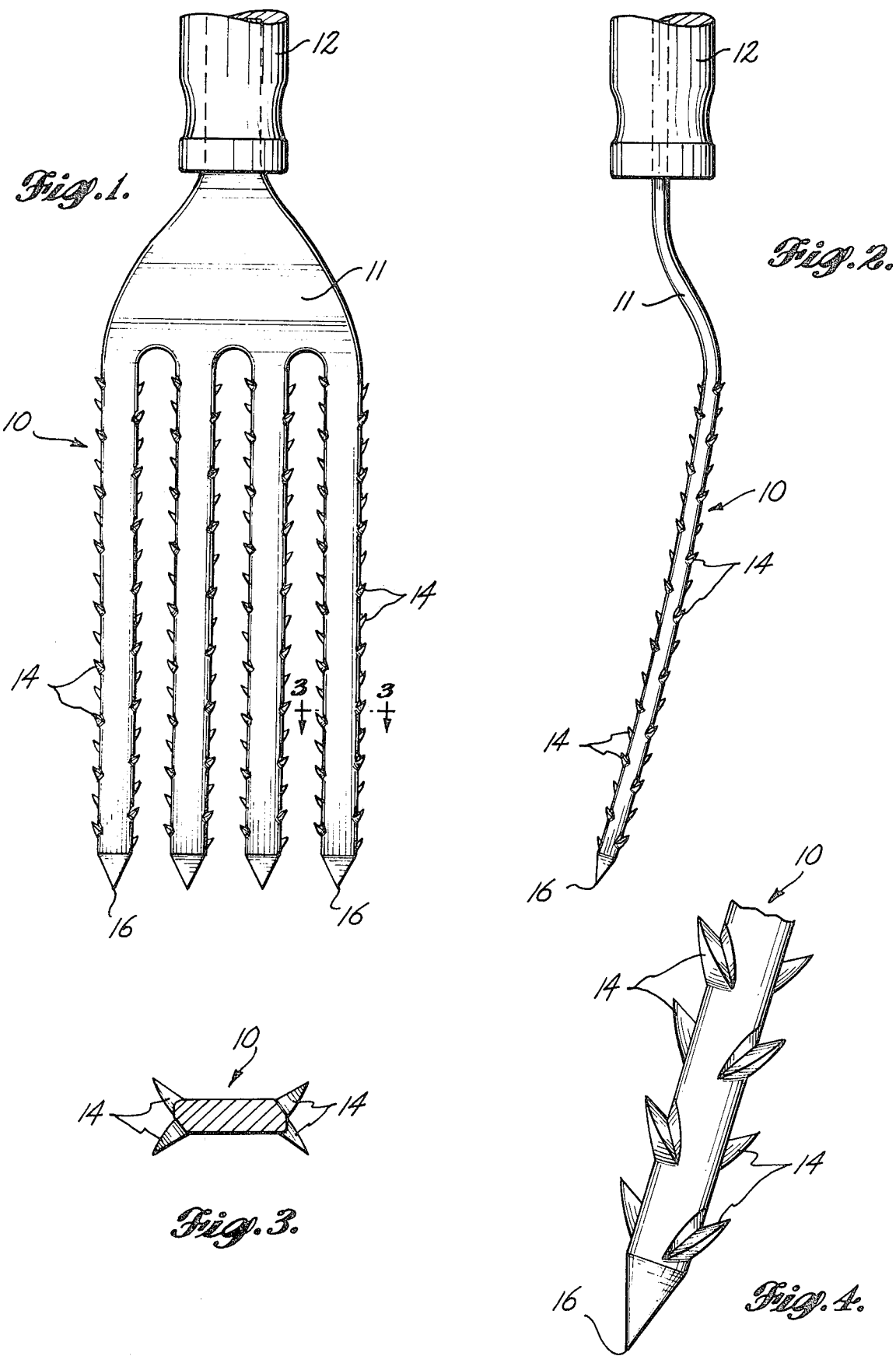

WEEDING TOOL

BACKGROUND OF THE INVENTION

The present invention relates to gardening tools and, more particularly, to weeding tools.

Various types of hand-held gardening tools are known in the prior art for dislodging and pulling weeds. Such tools typically operate to break up and loosen the soil around large roots so that the weed may be pulled manually with its large roots intact. Some tools operate merely to cut the stem or main taproot of the weed at or below the surface of the soil. A common disadvantage of the aforementioned tools is that often the deep main taproot is broken and a portion left in place where it can regenerate.

Another common disadvantage of all of the aforementioned tools is that they do not adequately remove small hair-like roots, or rootlets, that occur as delicate offshoots of larger weed roots. Such rootlets are typically broken off of larger weed roots and left in the ground during weeding. Because they are numerous and of a small size it has not been practical to attempt to remove them during weeding. Further, it is too tedious and time-consuming to attempt to remove such rootlets in a separate, subsequent operation after the weeds and their primary roots have been removed. Nevertheless, in many species of weeds such rootlets regenerate and propagate to create additional weeds.

Accordingly, it is an object and purpose of the present invention to provide a weeding tool that may be employed to dislodge and remove large weed roots as well as small rootlets.

It is also an object and purpose of the present invention to provide an improved weeding tool that operates to prevent the recurrence or repropagation of weeds by removing small rootlets from the soil during weeding.

It is another object and purpose of the present invention to provide a weeding tool that removes small rootlets from the soil in the ordinary course of removing large roots in a conventional manner.

SUMMARY OF THE INVENTION

In accordance with the present invention, a weeding tool is provided in the form of a fork having a plurality of tines. Each tine of the fork includes a plurality of small teeth that project outwardly and rearwardly from the sides of the tine. The tines of the fork are sufficiently large and strong to permit the fork to be used to break up soil and dislodge large weed roots to allow their manual removal in a conventional manner. As the fork is withdrawn from the soil, small rootlets dispersed throughout the soil are engaged by the rearwardly directed teeth of the tines and are withdrawn from the soil. Additionally, the teeth along the tines operate to grasp the large roots and assist in their withdrawal along with the small rootlets to thereby remove the entire weed root system in a substantially intact, integral condition.

BRIEF DESCRIPTION OF THE DRAWINGS

FIG. 1 is a plan view of the preferred embodiment of a weeding tool constructed in accordance with the present invention.

FIG. 2 is a side view of the weeding tool of FIG. 1.

FIG. 3 is an enlarged cross-sectional view of one tine taken along line 3—3 of FIG. 1.

FIG. 4 is an enlarged side view of a portion of one tine of the weeding tool of FIG. 1.

DETAILED DESCRIPTION OF THE PREFERRED EMBODIMENT

Referring to FIGS. 1-4, the preferred embodiment of the weeding tool of the present invention has the general configuration of a four pronged fork. The tool includes four tines, or prongs, 10 projecting outwardly from a common base 11, and a handle 12 affixed to the base 11. Each tine 10 includes a plurality of outwardly and rearwardly directed (i.e., toward the base) teeth 14 along each edge thereof. Each tine 10 is further tapered to a point 16 at the tip thereof.

The tine 10 lie generally in a plane and are disposed at a small angle with respect to the axis of the handle 12 for ease of handling. The tines 10 are generally slightly curved concavely upwardly in their axial dimensions. Referring to FIG. 3, each tine is generally rectangular or tubular with rounded edges in cross section, with the teeth 14 projecting outwardly from the rounded edges of the tines 10.

Referring to FIG. 4, serially adjacent teeth 14 along each edge of each tine 10 are alternately offset in opposite directions above and below the common plane of the tines 10 in a crescent configuration in much the same manner as the teeth of a crosscut saw. Each tooth 14 is approximately 1/16th inch long. There are approximately six to seven teeth per inch along each edge of each tine 10. The teeth 14 of opposing sides of adjacent tines 10 are preferably offset or staggered with respect to one another along the edges of the tines 10, as shown in FIG. 1.

In operation, the tines are manually driven into the ground around a weed plant to break up and loosen the soil around the large roots. The tines 10 may be used to directly engage large roots or may merely be used to break up the surrounding soil, depending on the size and other characteristics of the particular species of weed plant. As the soil is broken up and the large roots are loosened, the movement of the tines 10 in the soil and the subsequent withdrawal of the tines 10 from the soil causes the teeth 14 to catch and withdraw small rootlets that are associated with the larger roots and which are usually dispersed throughout the soil. Additionally, the teeth 14 act as gripping elements to assist in the grasping and withdrawal of the large roots. In this manner, the entire weed system, including the larger primary or taproots as well as the small rootlets, is extracted in an essentially intact and integral condition. The tool may be further worked in the soil following removal of the major portion of the weed plant to effect additional collection and removal of weed rootlets. The weeding fork is particularly efficient in removing weeds that have a relatively dense network of rootlets, for example dandelions, annual bluegrass, clover, coarse fescue, crabgrass, thistles and plantain.

Although the present invention is described and illustrated herein by reference to a preferred embodiment, it is understood that various alterations, modifications and substitutions that may be apparent to one skilled in the art may be made without departing from the essential spirit of the invention. For example, the tool may be constructed in various sizes to accommodate weed plants of different sizes. Likewise, the tines of the fork may be of various cross-sectional configurations and the weed removing teeth may be positioned in various ways along the tines. Accordingly, the scope of the present invention is defined by the following claims.

The embodiments of the invention in which an exclusive property or privilege is claimed are defined as follows:

1. A weeding fork comprising a plurality of substantially parallel, elongated tubular tines oriented in their flat dimension to extend in substantially coplanar alignment, a handle means to which said tines are attached, said tines each having a plurality of teeth projecting outwardly and rearwardly from each lateral side thereof for removing small rootlets from soil, the teeth along each side of each tine being alternately displaced on opposite sides of the plane of alignment of said tines in a cross-cut configuration.

2. The weeding fork defined in claim 1 wherein the teeth of opposing sides of adjacent tines are staggered with respect to one another along the sides of the tines.

3. In a weeding fork having a plurality of substantially parallel, elongated tubular tines oriented to extend in their flat dimension in substantially coplanar alignment, the improvement comprising a plurality of teeth projecting generally rearwardly and outwardly from the lateral sides of each of said tines for engaging and removing small rootlets from soil, said teeth along each side of each tine being alternately displaced on opposite sides of the plane of alignment of said tines in a cross-cut configuration.

4. The improvement defined in claim 3 wherein the teeth of opposing sides of adjacent tines are staggered with respect to one another along said tines.

* * * * *